Oct. 21, 1924.                                                    1,512,284
                       J. E. GREENAWALT
                         OIL BURNER
                    Filed March 21, 1923        3 Sheets-Sheet 1
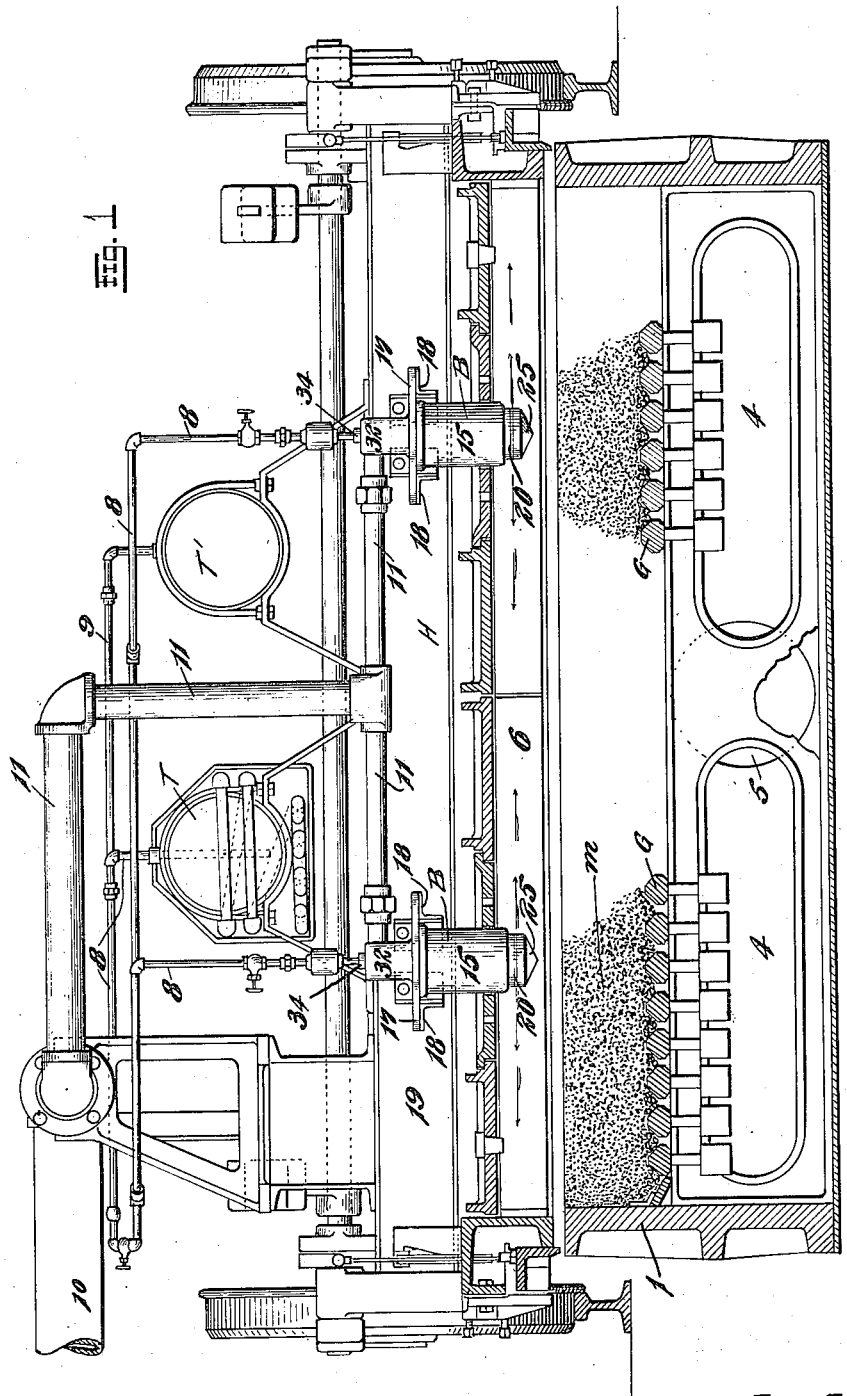
Inventor
JOHN E. GREENAWALT
by Harry A. Beimes Atty.

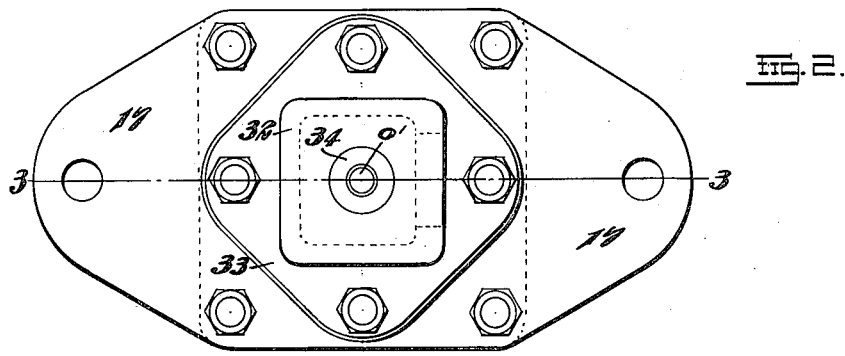
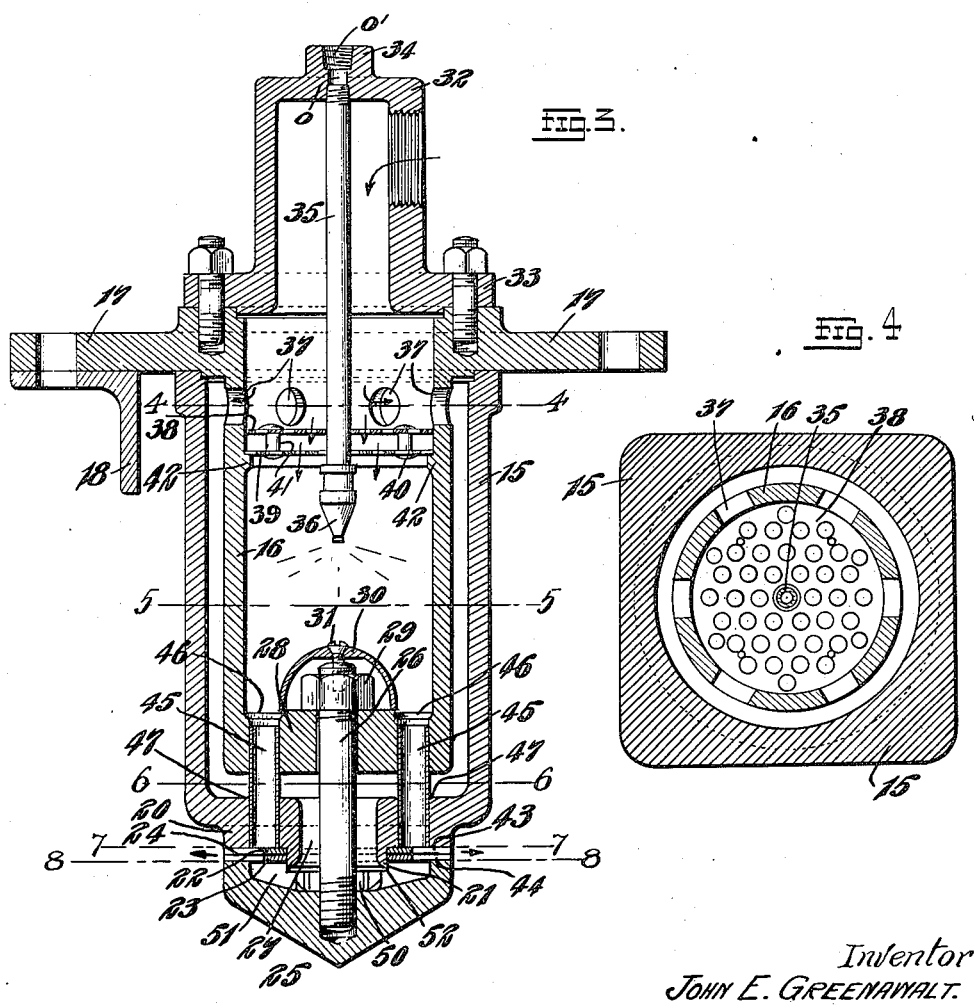

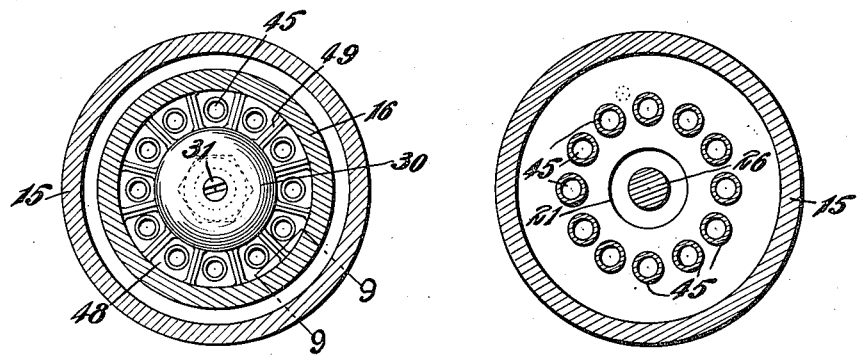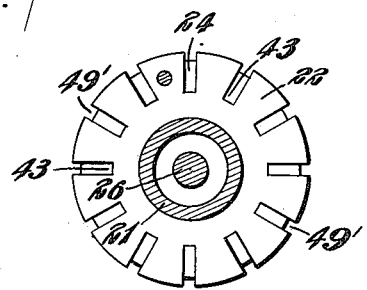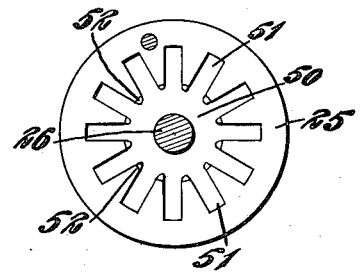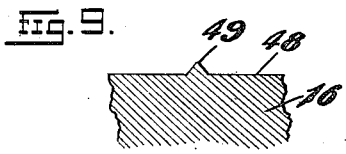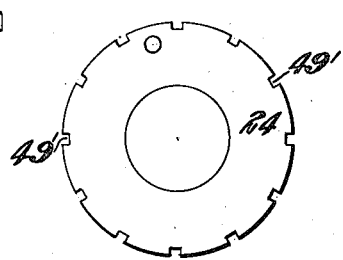

Patented Oct. 21, 1924.

1,512,284

UNITED STATES PATENT OFFICE.

JOHN E. GREENAWALT, OF NEW YORK, N. Y.

OIL BURNER.

Application filed March 21, 1923. Serial No. 626,669.

*To all whom it may concern:*

Be it known that I, JOHN E. GREENAWALT, citizen of the United States, residing at New York, in the county of New York and State of New York, have invented certain new and useful Improvements in Oil Burners, of which the following is a specification.

My invention has relation to improvements in oil (and vapor) burners, being an improvement over the burner disclosed in my United States Patent No. 1,084,939, dated Jan. 20, 1914.

The present invention is for the same general purpose as that of said patent, viz. for use in connection with the roasting and sintering of ores en masse where it is necessary to simultaneously ignite the entire surface of the charge in order to insure an even and uniform propagation therethrough of the combustion. As in the case of the patent mentioned, it is also an object of the present invention to construct a burner which will subdivide a given charge of igniting fuel into a plurality of streams or jets, and project these streams, under a sufficient pneumatic head over a wide area, said area being disposed directly over, and parallel to, the surface of the charge of ore (or other material) to be treated.

It is a further object of the present invention to thoroughly atomize the fuel with air in a mixing chamber, and to cause a second complement of air to impinge on the fuel as it is sprayed from the burner, thus increasing the atomization and causing a wider distribution of the fuel. The second complement of air is caused to circulate around the mixing chamber before impinging on the fuel, thus keeping down the temperature of said chamber, which prevents carbonizing and resultant clogging of the fuel passageways. And as this air circulation conducts the heat away from the walls of the mixing chamber it will, of course, take up this heat, which increase in temperature will augment the atomizing and vaporizing of the fuel.

Further objects are to construct a burner that is not necessarily restricted to liquid fuel (such as oil) for efficient action, but may also operate on solid and gaseous fuels; one that is simple and reliable in its action; and one possessing other advantages better apparent from a detailed description of the invention in connection with the accompanying drawings, in which—

Figure 1 is a cross-sectional view of a sintering pan with igniting hood carrying the burners in place, the burners and tanks, however, being in elevation; Fig. 2 is a top plan of my improved burner; Fig. 3 is a vertical middle longitudinal section through the burner taken on the line 3—3 of Fig. 2; Fig. 4 is a horizontal cross-section on the line 4—4 of Fig. 3; Fig. 5 is a horizontal cross-section on the line 5—5 of Fig. 3; Fig. 6 is a horizontal cross-section on the line 6—6 of Fig. 3; Fig. 7 is a horizontal cross-section on the line 7—7 of Fig. 3; Fig. 8 is a horizontal cross-section on the line 8—8 of Fig. 3; Fig. 9 is a cross-sectional detail on the line 9—9 of Figure 5; and Fig. 10 is a face view of the dividing disc between the oil and air distributing discs.

Referring to the drawings, 1 represents a pan or treatment receptacle which in practice may be of any convenient size, the dimensions of that here shown being about twelve feet in length, seven feet wide and two feet deep, the same being provided with grates G or equivalent perforated support for the charge $m$, the thickness of the charge being about twelve inches, and the upper surface thereof disposed substantially flush with the edges of the pan. The grates are raised above the bottom of the pan so as to leave a vacuum chamber 4 between the grates and said bottom, the pan being provided with hollow trunnions 5 (about which it is rotatable) communicating respectively with said chamber 4 and with a suitable exhauster (not shown). Adapted to be deposited on the pan directly over the charge is a hood H, the roof of which is sufficiently raised above the surface of the charge to form a combustion or igniting chamber 6 above the charge, the parts thus far described being in all essential particulars the same as in my U. S. Patent No. 1,110,623, and being referred to herein in order to show their relation to the burner to which my invention is specifically directed. In the present invention I employ a plurality of burners B mounted in the roof of the hood and discharging into the chamber 6, each burner covering or igniting an area of about fourteen square feet.

An oil tank T is mounted on the hood and supported thereby in any mechanical manner, and an oil line 8 leads from the tank to the several burners B. An air tank T' is also mounted on the hood from which a pipe 9 leads to the top of the oil tank T for supplying the necessary pressure under which the oil is fed to the burners. This pressure is preferably about sixty pounds, but any other pressure that will sufficiently atomize the oil will answer the purpose.

An air main 10 is provided to which the piping 11 leading to the burners B may be quickly connected by means of the cam-lever and latch mechanism which is described in detail in my copending application above referred to. The pressure at which the air is fed to the burners B is considerably less than that of the oil, being from about five to ten pounds, which I have found satisfactory.

Directing our attention now to the construction of the burner per se, with which this application is primarily concerned, and referring to Figures 2 to 9, it will be seen that the burner B is composed of a cylindrical housing 15 within which is disposed a fuel mixing chamber 16 whose wall and bottom are in spaced relation with the inner wall and bottom of the housing, the mixing chamber wall terminating at its upper end in a flange 17 by which the burner is supported on angles 18 fixed to the hood I-beams 19. The lower end of the housing 15 has a boss 20 of reduced diameter formed on it, said boss 20 having a boss 21 of still further reduced diameter projecting from it, and an oil distributing disc 22 and air distributing disc 23 separated by a dividing disc 24, all of which are provided with central perforations so as to be placed over the boss 21. The respective discs are held securely in intimate engagement, the oil distributing disc bearing against the face of boss 21, by a distributing cap 25 which carries a stud 26, said stud being passed through an opening 27 in the bottom wall of the housing 15 and a bore 28 in the bottom wall of the mixing chamber 16, and a nut 29 is screwed over the inner projecting end of the stud. Thus the stud 26 holds the housing 15, mixing chamber 16, distributing discs 22, 23, and cap 25 in assembled relation. A cover 30 is secured in place over the nut 29 by a screw 31 screwed into the end of stud 26. A top burner cap 32 is bolted through its flange 33 to flange 17 of the mixing chamber, and the top of said cap has a boss 34 in which is a tapped opening $o'$ for connection with the oil line 8. The opening $o$ communicates with the tapped opening $o'$ into which is screwed a pipe 35 carrying any well known type of spray nozzle 36 (such as a Schutte-Koerting) on its lower end. In the side wall of the burner cap 32 is large tapped opening O for receiving the air supply pipe 11.

The side wall of the mixing chamber 16 is provided with a series of holes 37 extending around its periphery just below flange 17, and just below the holes 37 within the mixing chamber is the upper member of a pair of perforated discs 38, 39, connected by rivets 40 and spacers 41, the lower member 39 resting on an annular shoulder 42 on the inside of the mixing chamber wall.

The oil distributing disc 22 and air distributing disc 23 are each provided with a plurality of radial slots 43 and 44 respectively extending entirely around the discs and in registering relation, the slots being of a length to extend from the periphery of the discs to a little more than half the distance to the boss 21, the bottom of the slots marking the center line of a series of tubes 45 connecting the mixing chamber 16 with the slots 43 of disc 22. The tubes 45 are fitted into registering openings 46, 46, etc., and 47, 47, etc., in the bottom of housing 15 and bottom of mixing chamber 16 respectively. The bottom of the chamber 16 is provided with an annular channel 48 with which the openings 47 communicate, said channel having a series of V-shaped ridges 49 so spaced that there is a ridge between any two openings 47, thus dividing the channel 48 into a number of equal depressions with each one of which a tube 45 communicates, thus insuring an absolutely equal distribution of the fuel spray from the nozzle 36 among the tubes 45. The dividing disc 24 is provided with a series of radial slots 49′ adapted to register with slots 43 and 44, the slots 49′, however, being comparatively short so that slots 43 and 44 will be in communication with each other but a short distance from their open (discharged) ends.

The opening 27 in the bottom of the housing 15 is considerably larger than the stud 26 which passes through it, thus leaving an annular passage-way which communicates with an annular passage-way in the cap 25 formed by a central chamber 50 in said cap and the stud 26. From the central chamber 50 in the cap a series of narrow channels 51 radiate (there being a channel 51 for each slot 44 in disc 23) said channels communicating with the inner ends of slots 44. The cap 25 is provided with a series of shoulders 52 between the channels 51 and annularly disposed for receiving the boss 21, and the upper face 53 of the cap bears against the disc 23.

In assembling the burner the discs 22, 23, and 24 are first placed on the cap 25 (a dowel pin 54 projecting from the cap and passing through holes in the discs insuring the correct relative disposition of discs and cap) the cap and discs then being placed against the bottom of the housing boss 20 (with the dowel pin entering a hole in the boss), the stud 26 passing through opening 27 and bore 28, and the cap then drawn up tightly by the nut 29. The cover 30 may now be secured over the nut 29. The assembly of cap 32 (that is, the cap already carrying tube 35, nozzle 36, and screen composed of discs 38, 39) may now be bolted in place and the burner is ready to be mounted on its supports. From the foregoing it will be seen that the burner is easily and quickly assembled, and that it is a comparatively simple matter to remove the distributing cap 25 and replace discs 22 and 23 with other discs having wider or narrower slots should occasion require it.

The operation of the burner may be described as follows:

The fuel, (preferably oil under a pressure of about sixty pounds) enters the pipe 35 from the oil line 8 and is sprayed from the nozzle 36 into the mixing chamber 16 below the screen made up of the perforated discs 38 and 39. At the same time air under a pressure of from five to ten pounds enters the burner cap 32 and is forced downwardly toward the mixing chamber 16. Just above the screen 38, 39 the air stream divides, some passing through the perforations of the screen and entering the mixing chamber as a large number of small streams, and some passing through the openings 37 into the air space S between the housing 15 and wall of the mixing chamber 16. The many small streams of air entering the mixing chamber impinge on the oil spray and atomize and carry the fine particles of oil with them as an intimate mixture of air and oil to the channel 48 where the ridges 49 serve to divide this mixture equally among the tubes 45, of which there is one for each slot 43, the mixture then being forced through the tubes to the slots. However, before the fine particles of oil and air are discharged from the slots 43 they encounter a second blast of air discharging from the slots 44 and impinging at slots 49' in disc 24 on the mixture about to be discharged from slots 43. This second complement of air has come down through the space S, opening 27, and channels 51, of which there is one for each slot 44, and in addition to further atomizing the oil in the mixture issuing from slots 43, this oil is vaporized to a certain extent because the air is hot, having come in contact with the heated wall of the housing 15. Of course, as the air passes through the space S between housing wall and mixing chamber wall and through the burner cap it conducts the heat of these members away, thus keeping them cool and preventing the oil from carbonizing in its passage-ways, and also preventing clogging of the slots 43, 44, and 49'.

The air blast that carries the oil to the tubes 45, the ridge 49 above and between adjacent tubes, the lower air blast issuing from slots 44, all contribute to bring about a practically perfect distribution of oil spraying from the slots 43, each slot receiving its proper proportion of oil so that the resulting flame is one of uniform intensity and spreads over an extended area. Hence the discs 22, 23, and 24 together constitute the distributing member. The sprays are delivered substantially at right angles to the axis of the burner, and said axis being perpendicular to the (horizontal) surface of the charge $m$, it follows that the series of radial sprays thus projected from each burner will collectively form a sheet of inflammable particles which, when ignited, will result in a sheet of flame or in a burning blanket which in turn effectively and almost instantaneously (and before the inflammable particles can be prematurely deflected into the charge by the exhauster) ignites simultaneously the entire surface of the section of the charge which is beneath said blanket, each burner thus igniting its part of the surface of the ore charge, and all the burners igniting the entire surface of such charge. Inasmuch as all the burners work simultaneously, it follows that the entire surface of the charge will be ignited at one and the same time, so that the zone of combustion of the combustible components of the charge will propagate itself evenly and uniformly through the charge from top downward in the general direction of the transverse air currents drafted through the charge by the action of the exhauster. The burner here shown operates on a minimum amount of liquid compared with the size and intensity of the sheet-flame produced, and may be used in many arts not necessarily akin to roasting or sintering ores.

The pressures under which the oil and air are forced into the burner may, of course, vary, as these pressures depend, in a measure, on the kind of spray nozzle used, on the radius of projection of the streams desired through the slots, the cross-sectional area of the slots, and a variety of circumstances. Obviously, however, the pressure of the fuel should be in excess of the gas pressure maintained in the mixing chamber so as to insure the projection of the fuel into the chamber.

Having described my invention, I claim:

1. In a device of the character described, a housing, a mixing chamber within said housing, means for projecting sprayed fluent material into the mixing chamber, means for supplying said chamber with gas, a distributing member disposed at one end of the housing, the mixing chamber communicating with one side of the distributing member, means for supplying the other side of the distributing member with gas, and means for preventing contact of the fluent material and gas in the distributor except at the periphery thereof.

2. In a device of the character described, a housing, a mixing chamber within the housing, means for projecting sprayed fluent material into the mixing chamber under pressure, a distributing member disposed at one end of the housing, the mixing chamber communicating with one side of the distributing member, and means for supplying the other side of the distributing member with gas and means for discharging the fluent material from the distributing member in sheet form.

3. In a device of the character described, a housing provided with a mixing chamber, means for injecting fluent material into the mixing chamber under pressure, a distributing member at one end of the housing in communication with the mixing chamber, and means for discharging in sheet form the fluent material from the distributing member between blasts of a suitable gas.

4. In a device of the character described, a housing provided with a mixing chamber, means for injecting fluent material into the mixing chamber under pressure, a distributing member at one end of the housing, said distributing member being provided with two sets of radially disposed channels in superposed relation open at their peripheries, one set of said channels being in communication with the mixing chamber, and means for supplying the other set with a suitable gas under pressure.

5. In a burner, a housing, a mixing chamber within said housing and having its walls spaced from the housing, said mixing chamber being provided with a transverse perforated partition wall and having openings in its walls above said partition wall, means for supplying the mixing chamber below the partition with a fluent material under pressure, means for supplying the chamber above the partition wall with a suitable gas, a distributing member at one end of the housing, a cap therefor provided with radial channels, one side of the distributing member being in communication with the mixing chamber, and the other side of the distributing member being in communication with the channels in the cap, said channels being in free communication with the space between the housing and mixing chamber walls.

6. A burner having a chamber provided with a terminal intake opening and peripheral discharge means, the chamber wall having a plurality of openings communicating with the discharge means, V-shaped dividing ridges between adjacent openings, and means for conducting gas under pressure into the chamber.

7. A burner comprising a tubular member provided with an air intake opening at one end, a housing around said tubular member and spaced therefrom, a perforated partition wall in the tubular member providing said member with an air chamber and a fuel and air mixing chamber, means for introducing fuel under pressure into the mixing chamber, the wall of the tubular member being provided with openings for connecting the air chamber and the air space between the tubular member and housing, a fuel distributing member disposed at one end of the housing, said member having two superposed sets of radially disposed channels open at their peripheries, each upper channel being connected to the mixing chamber by a passage-way, and each lower channel being connected to the air space by a passage-way.

8. In a burner comprising a tubular member having a mixing chamber, means for projecting fluent material into said chamber under pressure, means for supplying air to said chamber under pressure somewhat less than that of the fluent material, a distributing member disposed at one end of the tubular member, said distributing member comprising a pair of superposed discs having radial slots in registering relation and a dividing disc between the pair of discs, said dividing disc having radial slots of considerably less depth than and registering with those of the pair of discs, and a distributing cap secured to the tubular member for holding the discs in place, said cap having a radial channel for each slot of the lower disc, the tubular member having a series of passage-ways, one for each slot of the upper disc, and means for supplying the channels in the cap with air under pressure.

In testimony whereof I hereunto affix my signature.

JOHN E. GREENAWALT.